Figure 2:
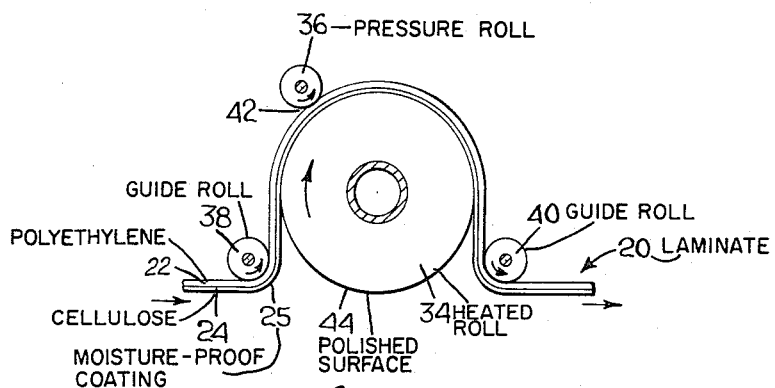

Nov. 16, 1965    W. F. UNDERWOOD    3,218,212
METHOD OF AND APPARATUS FOR FORMING A CLEAR GLOSSY LAMINATE
Filed June 14, 1960

INVENTOR.
WILLIAM F. UNDERWOOD
BY Elmer J. Fischer

ATTORNEY 3,218,212
METHOD OF AND APPARATUS FOR FORMING A CLEAR GLOSSY LAMINATE
William F. Underwood, Oak Park, Ill., assignor to Union Carbide Corporation, a corporation of New York
Filed June 14, 1960, Ser. No. 35,936
3 Claims. (Cl. 156—244)

This invention relates to a method and apparatus for forming a clear glossy laminate of polyethylene film and regenerated cellulose film having a moisture-proof coating on its surface remote from the polyethylene film. More particularly, this invention relates to removing surface inperfections in the moisture-proof coating which occur as the polyethylene film is laminated to the regenerated cellulose film.

Polyethylene film is generally applied to moisture-proof coated regenerated cellulose film by the extrusion coating process. In such process, polyethylene is melt-extruded downwardly from a slot-type die in film form. The die is ordinarily positioned above and in alignment with the laminating means. Such means include a pair of counter-rotating rolls; one being a rubber pressure roll and the other being a chilled metal roll. The regenerated cellulose film having a moisture-proof coating on one of its surfaces is fed from an external source over the rubber roll with the moisture-proof coating in direct contact with the peripheral surface of the rubber roll. At the nip of the laminating rolls, the molten polyethylene film is applied to the uncoated surface of the regenerated cellulose film. Here the bond or adhesion between the two films is produced. The resultant laminate is then passed around an arc of the chilled metal roll with the polyethylene film in direct surface contact with the metal roll so that it can be solidified.

Although the described process produces a satisfactory bond between the two films, it impairs the clarity and glossiness of the laminate. Vary the temperatures of the molten polyethylene, changing the nip pressure to improve the bonding and flow of the polyethylene film, and improving the surface characteristics of the roll which contacts the polyethylene film have not produced a laminate which is sufficiently clear for many applications.

The haziness of the laminate appears to result from imprints or impressions imparted to the moisture-proof coating on the regenerated cellulose film by its contact with the peripheral surface of the rubber roll. Such impressions or imprints are believed to be caused by the heat dissipated by the molten polyethylene film which softens the moisture-proof coating and makes it impressionable to normal irregularities in the peripheral surface of the rubber roll. Attempts to make the rubber roll smooth have not met with success. Additionally, the softness of the rubber roll renders its peripheral surface susceptible to damage during normal operating conditions which, of course, result in further surface irregularities.

Accordingly, it is an object of this invention to form a clear glossy laminate of polyethylene and regenerated cellulose film having a mositure-proof coating, on its surface remote from the polyethylene film.

Another object of this invention is to remove the surface imperfections in the moisture-proof coating of the regenerated cellulose film which occurs as the polyethylene film is laminated to the regenerated cellulose film.

Other and additional objects will become apparent hereinafter.

According to the present invention, a clear glossy laminate is formed from a hazy laminate of polyethylene film bonded to one surface of a regenerated cellulose film having a moisture-proof coating on its other surface wherein such moisture-proof coating has surface imperfections, by heating the moisture-proof coating of the laminate to a temperature sufficient to soften it, hereinafter also referred to as its softening point, and then planishing the softened moisture-proof coating by maintaining it under pressure for a time sufficient to remove its surface imperfections. Such moisture-proof coating of the laminate can be heated to its softening point by contacting it with a highly polished or smooth rigid surface maintained at an elevated temperature and when softened pressure contacting said moisture-proof coating against said surface for a time sufficient to remove surface imperfections.

In a preferred embodiment of the invention, the means for removing the surface imperfections in the moisture-proof coating of the laminate include a pair of counter-rotating pressure rolls; one being a roll having a highly polished or smooth peripheral surface heated to a temperature sufficient to heat the coating to its softening point. The laminate is fed over an arc of the roll having the heated smooth peripheral surface with the moisture-proof coating in direct contact therewith for a time sufficient to heat said coating to its softening point. At the nip of the rolls, the softened moisture-proof coating is planished by being maintained under pressure for a time sufficient to remove the surface imperfections whereby the laminate becomes clear and glossy.

For convenience and economy, it is desirable to feed the laminate to the means for removing the surface imperfections in the moisture-proof coating immediately after forming the laminate in a continuous type process. However, this invention can be practiced by removing the surface imperfections in the moisture-proof coating some time after forming the laminate, as hereinafter more fully described.

The term "moisture-proof coating" is used herein to define well known coatings which have helped regenerated cellulose commercially by lowering its otherwise high moisture permeability. Generally, the moisture-proof coating primarily consists of nitrocellulose and a hydrocarbon wax. Furthermore, the term "softening point" or its equivalent is used herein to define that temperature at which the moisture-proof coating can be planished.

Figure 1:
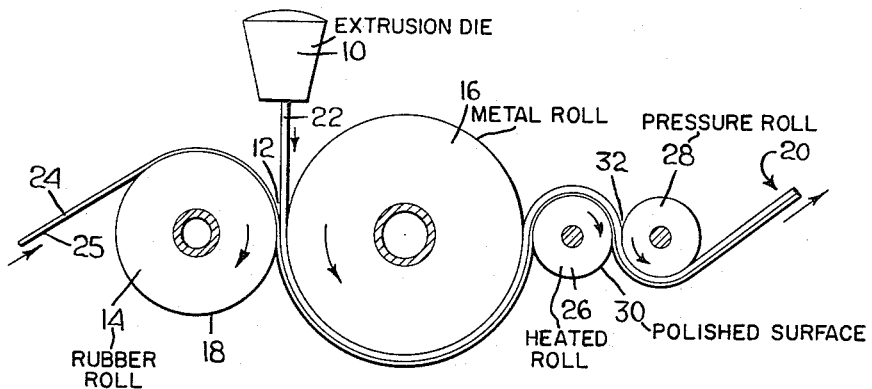

The nature of the invention and the manner in which the invention may be practiced will become clear from the detailed description when taken in conjunction with the accompanying drawings forming a part of the specification and wherein;

FIGURE 1 is a side elevation, partly in section, schematically illustrating one form of the invention; and FIGURE 2 is a side elevation, partly in section, schematically illustrating another form of the invention.

Referring now to the drawings, and more particularly to FIGURE 1, the reference numeral 10 designates a slot-type extrusion die spaced above and in alignment with the nip 12 of a pair of counter-rotating rolls 14 and 16. The rolls 14 and 16 are suitably mounted to apply a controllable pressure on the films passing through the nip 12 by means well known to those skilled in the art.

The roll 16 is rigid, preferably being made of metal. The peripheral surface of the metal roll 16 is smooth to prevent the polyethylene film from adhering to it and to prevent marking of such film. Additionally, the roll 16 is chilled, such as by circulating cooled water therethrough, for solidifying the polyethylene film, as hereinafter more fully set forth.

The roll 14 is made of compressible rubber. Illustrative of the types of rubber which can be used include natural, hycar, butyl, silicone elastomer and buna N. In general a roll 14 made from any one of these materials has irregularities in its peripheral surface 18. Such surface irregularities are believed to result from the nature of the compressible material in that the desired smoothness cannot be obtained in the finished roll. Additionally, the softness of the compressible material renders its surface 18 susceptible to damage under normal operation which also produces the undesirable surface irregularities.

In forming a laminate 20 of polyethylene film 22 and regenerated cellulose film 24 having a moisture-proof coating 25 on its surface remote from the polyethylene film 22, the peripheral surface 18 of the roll 14 makes imprints or impressions in the moisture-proof coating 25 which greatly impairs the clarity and glossiness of the laminate 20.

To remove the surface imperfections in the moisture-proof coating and thereby make the laminate 20 clear and glossy, a pair of counter-rotating rolls 26 and 28 are placed adjacent to and in horizontal alignment with the rolls 14 and 16. Moreover, the axes about which the rolls 26 and 28 rotate are parallel and their peripheral surfaces are in contact to form a nip 32.

The roll 28 is a conventional pressure roll preferably being made of rubber. The roll 26 is located nearest the roll 16 and is preferably made of metal with its peripheral surface 30 being smooth or highly polished. Additionally, such surface 30 is heated to an elevated temperature, such as by circulating hot water through the interior of roll 26 for softening the moisture-proof coating 25 in contact therewith.

The rolls 26 and 28 are suitable mounted to apply a controllable pressure on the moisture-proof coating of the laminate 20 passing through their nip 32, by means well known to those skilled in the art for planishing or removing the surface imperfections in the softened moisture-proof coating, as hereinafter more fully set forth.

In continuously forming a clear glossy laminate 20, the regenerated cellulose film 24 is fed from an external source over the rubber roll 14 with its moisture-proof coating 25 in direct contact with the peripheral surface 18 of such roll 14 whereby imprints or impressions are made in the moisture-proof coating. Concurrently the polyethylene is melt-extruded downwardly from the die 10 in film form. At the nip 12 of the laminating rolls 14 and 16, the molten polyethylene film 22 is applied to the uncoated surface of the regenerated cellulose film 24. Here the bond or adhesion between the films 22 and 24 is produced. With the polyethylene film 22 in peripheral contact with the chilled metal roll 16, the hazy resultant laminate 20 is then passed around an arc thereof for solidifying the polyethylene film 22.

Immediately thereafter the laminate 20 is fed over an arc of the roll 26 with the moisture-proof coating in direct contact with its heated peripheral surface 30 for heating said coating to its softening point. The laminate 20 is then fed through the nip 32 at a rate sufficient to permit the rolls 26 and 28 to exert pressure on the softened moisture-proof coating for a time sufficient to planish the moisture-proof coating surface. As a result, the surface imperfections are removed and the laminate 20 becomes clear and glossy. The clear glossy laminate is then fed to an external source, such as a reel on which it is wound.

In the embodiment of the invention shown in FIGURE 2, the laminate 20 is formed in the manner hereinbefore set forth. Thus, the moisture-proof coating has surface imperfections which make the laminate 20 hazy.

The means for removing the impressions or imprints in the moisture-proof coating include a pair of counter-rotating rolls 34 and 36 and a pair of guide rolls 38 and 40.

The roll 36 is a conventional pressure roll preferably being made of rubber. Such roll 36 has a diameter substantially less than the diameter of the roll 34 and is positioned opposite the upper portion of the roll 34 nearest the guide roll 38 for forming the nip 42.

The guide rolls 38 and 40 rotate about horizontally level parallel axes and are positioned about opposite portions of the base of the roll 34 in parallel relationship therewith for maintaining the laminate 20 in tension contact with the roll 34 while it is fed thereover, as hereinafter more fully set forth.

The roll 34 is preferably made of metal with its peripheral surface 44 being smooth or highly polished. Additionally, such surface 44 is heated to an elevated temperature as by circulating hot water through the interior of roll 34 for softening the moisture-proof coating 25 of the laminate 20 brought into contact herewith.

The rolls 34 and 36 rotate about horizontally level parallel axes and are suitably mounted to apply a controllable pressure on the moisture-proof coating of the laminate 20 passing through the nip 42 by means well known to those skilled in the art for removing the surface imperfections in the softened moisture-proof coating.

The means shown in FIGURE 2 for removing the impressions or imprints in the moisture-proof coating can be mounted adjacent the laminating rolls 14 and 16 in order that a clear glossy laminate 20 can be formed in a continuous type process. For convenience and economy, this is preferred.

However, the surface imperfections in the moisture-proof coating can be removed some time after forming the laminate 20. If such a process is desired, the laminate 20 having a hazy appearance can be wound on a reel and stored, not shown. Then when desired, the laminate 20 can be made clear and glossy by the practice of this invention.

In any event, the hazy laminate 20 is fed about the underside of the guide roll 38 and about the roll 34 with the moisture-proof coating 25 in direct contact with the heated peripheral surface 34 for softening said coating to its heating point. The laminate 20 is then fed through the nip 42 at a rate sufficient to permit the rolls 34 and 36 to exert pressure on the softened moisture-proof coating for a time sufficient to planish the moisture-proof coating surface. As a result, the surface imperfections are removed and the laminate 20 becomes clear and glossy. The clear glossy laminate is then fed about the underside of guide roll 40 and then to an external source, such as a reel on which it is wound, not shown.

Preferably, the polyethylene film 22 is made from film-forming ethylene polymers having a density of 0.93 or less.

The polyethylene film 22 need not be self-supporting and its thickness can be varied by correlating the thickness of the molten material being extruded through the die opening, the relative travel rate of the films 22 and 24, and the pressure obtained at the nip 12 of the counter-rotating rolls 14 and 16. Desirably the polyethylene film 22 of the resultant laminate 20 is relatively thin having a thickness from about 0.2 mil to about 10 mils.

Although the polyethylene film 22 need not be self-supporting, the regenerated cellulose film 24 is self-supporting with thicknesses of 1 mil to 2 mils having been found satisfactory.

Moreover, the uncoated surface of the regenerated cellulose film 24 can have printed matter thereon.

With respect to the moisture-proof coating 42 on the regenerated cellulose film it can be 0.1 mil or greater in thickness. Such moisture-proof coating has a softening point from about 180° F. to 200° F. and generally includes nitrocellulose, plasticizer, rosin and hydrocarbon wax. For a more detailed discussion of these well known moisture-proof coatings see volume 44 of Industrial and Engineering Chemistry, pages 2511 through 2524, and the book entitled "Cellulosics" which was published by Reinhold Publishing Corporation.

The details and manner of practicing this invention will become apparent by reference to the following specific examples; it being understood that these examples are merely illustrative embodiments of the invention and that the scope of the invention is not limited thereto.

Example I

A continuous laminate of polyethylene film and regenerated cellulose film having a moisture-proof coating on its surface remote from the polyethylene film was formed using the extrusion coating apparatus as illustrated in FIGURE 1 of the drawing with the resultant hazy laminate being made clear and glossy using apparatus as illustrated in FIGURE 2 of said drawing.

The regenerated cellulose film had a thickness of 1 mil. The moisture-proof coating had a softening point of about 180° F. The polythylene had a melt index of 3.0 and a density of 0.92. The die 10 was at a temperature of about 600° F. and downwardly melt-extruded the polyethylene in film form which had a thickness of 20 mils. The roll 16 was made of metal having a smooth peripheral surface which was maintained at a temperature of about 100° F. The roll 14 was made of rubber having a hardness of 95 as measured by the "Durometer" test procedure and the peripheral surface 18 of such roll had irregularities therein. The regenerated cellulose film 24 was fed over the rubber roll 14 with the moisture-proof coating 25 in direct contact with its rough peripheral surface 18 which made impressions or imprints in said coating. At the nip 12 of the rolls 14 and 16, the molten polyethylene film 22 was applied to the uncoated surface of the regenerated cellulose film 24. Here the bond between the films 22 and 24 was produced by the rolls 14 and 16 which exerted a laminating pressure thereagainst of about 20 pounds per lineal inch at the nip. The polyethylene film 22 had a final thickness of 2 mils and was solidified by passing the resultant laminate 20 over an arc of the chilled metal roll 16 with the polyethylene film 22 in direct contact therewith. Immediately thereafter the laminate 20 was fed about the underside of the guide roll 38 and about the roll 34 with the moisture-proof coating 25 in direct contact with the heated smooth peripheral surface 44 maintained at a temperature of 212° F. At the time the moisture-proof coating 25 had reached the nip 42 it was at its softening point whereat the softened moisture-proof coating was subjecting to a pressure 20 pounds per lineal inch at the nip. The laminate 20 was withdrawn from the nip 42 at the rate of 50 feet per minute which allowed the rolls 34 and 36 sufficient time to remove the surface imperfections from the moisture-proof coating. The clear glossy laminate was then fed about the underside of the guide roll 40 to an external source such as a reel upon which it was wound and the clarity of the laminate was measured by test procedure ASTM D–1003–52. Such clear glossy laminate had a total haze value of 4.06.

Example II

The procedure set forth in Example I was repeated. The clarity of the resultant clear glossy laminate had a total haze value of 4.2 as measured by test procedure ASTM D–1003–52.

For purposes of comparison a laminate was also formed by the procedure set forth in Example I except that the surface imperfections of the moisture-proof coating caused by irregularities in the peripheral surface 18 of the rubber roll 14 were not removed. Rather, after forming the laminate 20, it was immediately wound upon a reel. The clarity of the resultant laminate was measured by test procedure ASTM D–1003–52. The total haze value of the laminate was 25.4.

Thus, the Examples 1 and 2 dramatically illustrate the significant increase in the clarity of the laminates formed by the practice of this invention over the clarity of a laminate formed without the benefit of this invention.

A clear glossy laminate of polyethylene film and regenerated cellulose film having a moisture-proof coating on its surface remote from the polyethylene film formed by the practice of this invention can be used extensively in food packaging. The polyethylene film and moisture-proof coating serve as excellent moisture-proof barriers while the regenerated cellulose film is highly resistant to the action of oil materials and is an excellent barrier to many gases. Also such laminate can be readily heat sealed to form heat seals characterized by their strength. Additionally, the clear glossy laminate is transparent so that the packaged contents therein can be readily seen.

While it is preferred to form a clear glossy laminate including a coating of either low density, medium density or high density polyethylene, other polyolefins including polypropylene, polyisobutylene, and copolymers thereof can also be employed.

Since it is obvious that various changes and modifications may be made in the described method and apparatus without departing from the nature and spirit thereof, it is to be understood that the invention is not limited thereto except as set out in the appended claims.

What is claimed is:

1. In a process for producing a clear glossy laminate from a hazy laminate of polyethylene film laminated to one surface of regenerated cellulose film having a nitro cellulose and hydrocarbon wax containing a moisture-proof coating on its other surface wherein said coating has surface imperfections; the steps which comprise rotating a pair of counter-rotating rolls adapted to exert pressure at the nip thereof, one of said rolls having a smooth rigid peripheral surface; heating said smooth rigid peripheral surface to a temperature substantially above the softening point of the moisture-proof coating; feeding said hazy laminate about an arc of said heated smooth peripheral surface with the moisture-proof coating in direct contact therewith and heating said coating to its softening point; and passing the laminate through the nip of the counter-rotating rolls whereas the softened moisture-proof coating is subjected to pressure, said moisture-proof coating being subjected to the pressure at the nip for a time sufficient to remove its surface imperfections.

2. In a process for removing surface imperfections from a laminate of polyethylene film and regenerated cellulose film, which has only one of its surfaces coated with a wax containing moisture-proof coating, the steps which comprise: feeding a moisture-proof coated regenerated cellulose film to a laminating zone; melt extruding polyethylene in film form; feeding said extruded polyethylene to said laminating zone; pressing and laminating one surface of said extruded polyethylene film to the uncoated surface of the regenerated cellulose film, while cooling the other surface of the extruded polyethylene film and resiliently and flexibly supporting the coated surface of the regenerated film; contacting the moisture-proof coating of the laminate with a highly polished rigid surface maintained at an elevated temperature until the coating is heated to its softening point and pressure contacting the softened moisture-proof coating against said highly polished surface until said surface imperfections are removed.

3. In a process for producing a clear glossy laminate of a polyolefin film and a regenerated cellulose film, which has a wax containing moisture-proof coating on only one outer surface, from a hazy laminate produced by employing a pair of counter-rotating laminating rolls, one roll having a smooth, cooled rigid peripheral surface and the other roll having a rubber peripheral surface with irregularities therein, by feeding the moisture-proof coated regenerated cellulose film over the rubber roll and through the nip of the counter-rotating laminating rolls, with the moisture-proof coating in direct contact with said rubber roll, while melt extruding the polyolefin in film form and laminating one surface of the molten polyolefin film to the uncoated surface of the regenerated cellulose film at the tip of the counter-rotating laminating rolls, with the opposite surface of the polyolefin film contacting the cooled rigid peripheral surface of said one roll whereby a hazy laminate is formed due to the surface imperfections in the moisture-proof coating of the regenerated cellulose film imparted thereto by the irregularities in the peripheral surface of the rubber roll; the improvement which comprises treating said hazy laminate by moving and pressing said hazy laminate against an arcuate heated smooth rigid surface, with the moisture-proof coating in direct contact with said surface, the period of contact being at least sufficient to heat said coating to its softening point, whereby surface imperfections in the moisture-proof coating are removed.

References Cited by the Examiner
UNITED STATES PATENTS

| | | | |
|---|---|---|---|
| 2,064,360 | 12/1936 | Schur | 117—65.2 |
| 2,381,942 | 8/1945 | Wickwire | 117—64 XR |
| 2,388,339 | 11/1945 | Paxton et al. | 117—64 |
| 2,431,042 | 11/1947 | Ingersoll | 18—57 |
| 2,956,671 | 10/1960 | Cornwell | 206—46 |
| 3,017,302 | 1/1962 | Hullkrans | 154—43 |
| 3,033,707 | 5/1962 | Lacey et al. | 117—76 |

FOREIGN PATENTS 641,568　8/1950　Great Britain.

EARL M. BERGERT, *Primary Examiner.*

CARL F. KRAFFT, *Examiner.*